July 4, 1944.  K. LANNERT  2,353,047

ELECTRIC MOTOR STRUCTURE

Filed April 4, 1942

INVENTOR
KENNETH LANNERT
ATTORNEY

Patented July 4, 1944

2,353,047

UNITED STATES PATENT OFFICE 2,353,047

ELECTRIC MOTOR STRUCTURE

Kenneth Lannert, Overland, Mo., assignor to Carter Carburetor Corporation, St. Louis, Mo., a corporation of Delaware Application April 4, 1942, Serial No. 437,705

8 Claims. (Cl. 171—325)

This invention relates to electric motors and consists more particularly in the structural constituents and/or characteristics of the brushes thereof.

Where an electric motor operates in the presence of air or an electrolyte, it has been found convenient and practical to form the brushes of identical material so as to have uniform properties of hardness, conductivity, and so forth. In such case, the brushes are customarily formed chiefly of carbon with finely divided metal, such as copper, interspersed therethrough. During operation, metallic ions or particles escape or are mechanically torn out of the running surface of the positive brush and hence the surface becomes less metallic. Motors with brushes operating in air have the advantage of an insulating oxide layer which is formed on the copper commutator, the thickness or effectiveness of which, when properly controlled, reduces commutator wear and improves commutation. Accordingly, the metallic content of the brushes may be made as high as desirable, in order to provide a brush having amply adequate commutating characteristics as well as strength and durability, without causing excessive wear of the commutator.

However, where the electric motor must operate submerged in gasoline or other non-electrolyte, no such oxide layer is formed on the commutator and it has been found that ordinary brushes having uniform proportions of interspersed carbon and metal may not be used successfully, both on the positive and negative sides. Under such conditions, it appears that a rather high proportion of metal content is necessary in the positive brush, but a corresponding metal content in the negative brush produces excessive wear of the commutator. It is desirable, therefore, to provide a negative brush having substantially less metal content or hardness than the positive brush. It has also been found that the positive brush of a motor operating under such conditions deposits material upon the commutator and, since the commutator should be kept free of carbon to the extent that motor operation is not impaired, it is desirable to reduce, as far as possible, the carbon content of the positive brush. Increasing the proportion of metal in the positive brush, of course, provides a harder brush, but this is no disadvantage since, for a reason not fully understood at present, wearing of the commutator is not caused by the positive brush to nearly as great an extent as by the negative brush.

In the Patent #2,261,915, Nov. 4, 1941, issued to Korte and Lannert, there is shown an electric fuel pump for automobiles in which the pump operating motor is normally submerged in the fuel tank. With this motor, it has been found that the present invention has great utility. The increased metal content of the positive brush permits this brush to be more cheaply and easily manufactured and a suitable pitch or other binder may be used. During operation, some of the metal of the positive brush is carried away and first deposited on the commutator and then wiped on or carried to the bearing face of the negative brush. Such transfer of metal provides additional reasons for decreasing the proportion of metal in the negative brush below that of the positive brush.

In the accompanying drawing which illustrates the invention,

Fig. 1 shows the electric fuel pump, generally designated P, connected in an automotive circuit including the generator G, battery B, reverse current cut-out C, ignition S. The entire pump P is submerged in gasoline in the fuel tank 11 customarily located at the rear of the vehicle.

Figure 1:
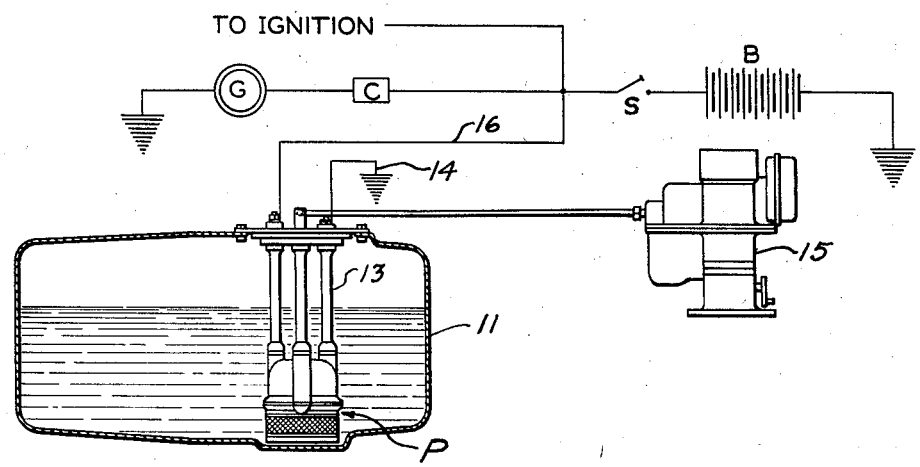
Fig. 1 is a diagrammatic view illustrating an electric fuel pump of the type shown in the above mentioned Korte and Lannert patent, together with suitable wiring.

The fuel pump and operating motor therefor are enclosed within a casing 12 suitably supported from a wall or top of the fuel tank and connected by piping 13 to the carburetor 15 mounted on the engine at the front of the vehicle. One side of the motor is grounded at 14, conveniently through the vehicle frame (not shown) and the other side is connected by a wire 16 to the battery-generator circuit.

The pump impeller 18 is rigid with the lower portion of the motor armature shaft 19 and, beneath the impeller, is the motor commutator 20 also on this shaft. Brushes 21 and 22 are slidably mounted in brush carriers 23 and 24 and normally urged against the commutator bars by small coiled springs 25 and 26. The structure of this pump, generally, is more fully shown and claimed in the above mentioned Korte and Lannert patent.

Figure 3:
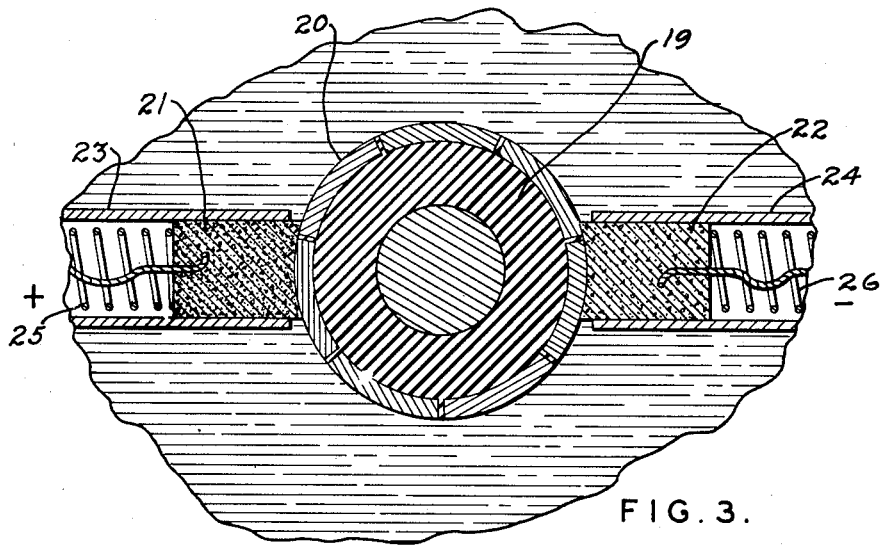
Fig. 3 is an enlarged section taken on line 3—3 of Fig. 2.
Figure 2:
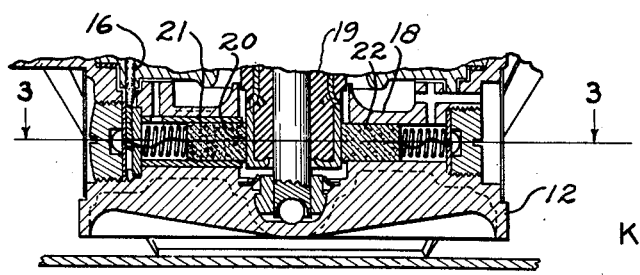
Fig. 2 is an enlarged vertical section of the lower portion of the pump and particularly showing the brush and commutator structure.

As better indicated in Fig. 3, the brushes are formed of carbon with interspersed particles of copper. Positive brush 21 has a substantially larger proportion of interspersed copper particles than negative brush 22. It has been found that using a six volt circuit, the positive brush may be constructed, successfully, of a 50% mixture of copper and carbon particles with a binder and the negative brush may be formed of 30% copper and the balance carbon. Preferably, the binder is omitted from the negative brush since the usual binders, when baked in formation of the brush are transformed into a hard coke-like substance. The net result is that the negative brush with lower metal content and without the binder, is considerably softer than the positive brush, only sufficient copper being used in the negative brush to provide for adequate conductivity. The brush may be formed in any of the usual methods known to brush manufacturers and the copper may be powdered, flaked or electrolytically formed in accordance with the practice of the manufacturer.

By means of the brush and commutator structure, as described above, the fuel pump motor is enabled to run submerged in gasoline for long periods of time without excessive wear of the brushes or commutator and without substantial "dirtying" of the commutator due to deposited carbon and the resultant fluctuation or lowering of the motor efficiency. Copper, silver, or other metals having relatively high conductivity may be dispersed through the carbon of the brushes so as to provide for adequate strength, durability and conductivity.

Various modifications may be made as will occur to those skilled in the art and the exclusive use of all modifications as come within the scope of the appended claims is contemplated.

I claim:

1. An electric motor having a commutator and positive and negative brushes, each brush being formed of a first conducting material with a second material of greater conductivity dispersed therethrough, the proportion of the material of greater conductivity in said positive brush being greater than the proportion of the corresponding material of the negative brush.

2. An electric motor having a commutator and positive and negative brushes, each brush being formed of a first material softer than said commutator, and a second material of harder than said first material and dispersed therethrough, the proportion of said harder material in the positive brush being substantially greater than the proportion of the corresponding material in the negative brush.

3. An electric motor having a metallic commutator and positive and negative brushes, each of said brushes being formed of carbon with finely divided metal interspersed therethrough, the proportion of metal in said negative brush being substantially less than that in said positive brush.

4. An electric motor, having a commutator and positive and negative brushes, each of said brushes being formed of a first material softer than said commutator and of a second material interspersed therethrough and of substantially greater conductivity and hardness than said first material, the proportion of the second material in the negative brush being substantially less than that in said positive brush to minimize wear of said commutator by said negative brush.

5. An electric motor having a commutator and positive and negative brushes normally urged thereagainst, each of said brushes consisting of interspersed carbon and metal, the proportion of metal in said negative brush being substantially less than that in said positive brush to minimize wear of said commutator.

6. An electric motor having a commutator and positive and negative brushes normally urged thereagainst, each of said brushes consisting of interspersed carbon and metal, the proportion of carbon in said positive brush being substantially less than that in said negative brush so as to minimize the transfer of carbon to said commutator from said positive brush during operation.

7. In an electric motor for operation submerged in a medium substantially devoid of oxygen in free or combined form, a metallic commutator and positive and negative brushes normally urged thereagainst, said brushes having interspersed carbon and metal constituents, said positive brush having a substantially higher proportion of metal constituent than said negative brush to provide for loss of metal from said positive brush during operation and to minimize transfer of carbon to said commutator.

8. An electric motor having a commutator and positive and negative brushes normally urged thereagainst, said positive brush being formed of interspersed carbon and metal constituents with a binder and said negative brush being formed of interspersed carbon and metal constituents without a binder and with substantially less metal proportionately than said positive brush to minimize wear of said commutator.

KENNETH LANNERT.